(12) United States Patent
Wessel

(10) Patent No.: US 6,510,757 B1
(45) Date of Patent: Jan. 28, 2003

(54) CABLE GUIDE IN A SHIFT LEVER FOR BICYCLE GEARS

(75) Inventor: Robert Wessel, Würzburg (DE)

(73) Assignee: Sram Deutschland GmbH, Schweinfurt (DE)

( * ) Notice: Subject to any disclaimer, the term of this patent is extended or adjusted under 35 U.S.C. 154(b) by 0 days.

(21) Appl. No.: 09/744,041

(22) PCT Filed: Apr. 8, 2000

(86) PCT No.: PCT/EP00/03155

§ 371 (c)(1),
(2), (4) Date: Jan. 16, 2001

(87) PCT Pub. No.: WO00/69714

PCT Pub. Date: Nov. 23, 2000

(30) Foreign Application Priority Data

May 14, 1999 (EP) .......................... 199 22 328

(51) Int. Cl.$^7$ ........................ F16C 1/10; G05G 13/00; G05G 1/08
(52) U.S. Cl. .................. 74/502.2; 74/489; 74/505; 74/506
(58) Field of Search ................ 74/489, 502.2, 74/502.4, 502.6, 505, 506; 24/115 R

(56) References Cited

U.S. PATENT DOCUMENTS

| | | | | |
|---|---|---|---|---|
| 4,292,859 A | * | 10/1981 | Teraura | 74/505 X |
| 4,850,084 A | * | 7/1989 | Iwasaki | 24/115 R |
| 4,907,553 A | * | 3/1990 | Porter | 123/400 |
| 5,732,598 A | | 3/1998 | Shoge et al. | |
| 5,964,123 A | * | 10/1999 | Arbeiter | 74/489 |
| 6,216,553 B1 | * | 4/2001 | Wessel et al. | 74/502.2 |

FOREIGN PATENT DOCUMENTS

| | | | | |
|---|---|---|---|---|
| DE | 19922327 A1 | * | 11/2000 | 74/505 |
| EP | 0 628 475 A1 | | 10/1994 | |
| EP | 0671318 A2 | * | 9/1995 | 74/489 |
| EP | 0 676 325 A2 | | 10/1995 | |
| WO | WO 97/27405 | * | 7/1997 | 74/502.2 |

* cited by examiner

*Primary Examiner*—Vinh T. Luong
(74) *Attorney, Agent, or Firm*—Laurence A. Greenberg; Werner H. Stemer; Ralph E. Locher

(57) ABSTRACT

A shift lever is used to remotely operate the change of gear in a set of bicycle gears. The shift lever comprises a housing part and a cable winder with a cable guide which the bicycle user can operate in a winding rotational direction to wind a cable, or in a releasing rotational direction to release the cable. One end of the cable connects interactively with the cable winder, at least in one of the two rotational directions. The housing part has a bar with a guiding edge which together with the cable guide form a cable channel for the cable, from which the cable cannot deviate, if the cable winder is actuated in the releasing rotational directional this occurs if the other end of the cable is not pulled or taken up by the set of gears.

8 Claims, 1 Drawing Sheet

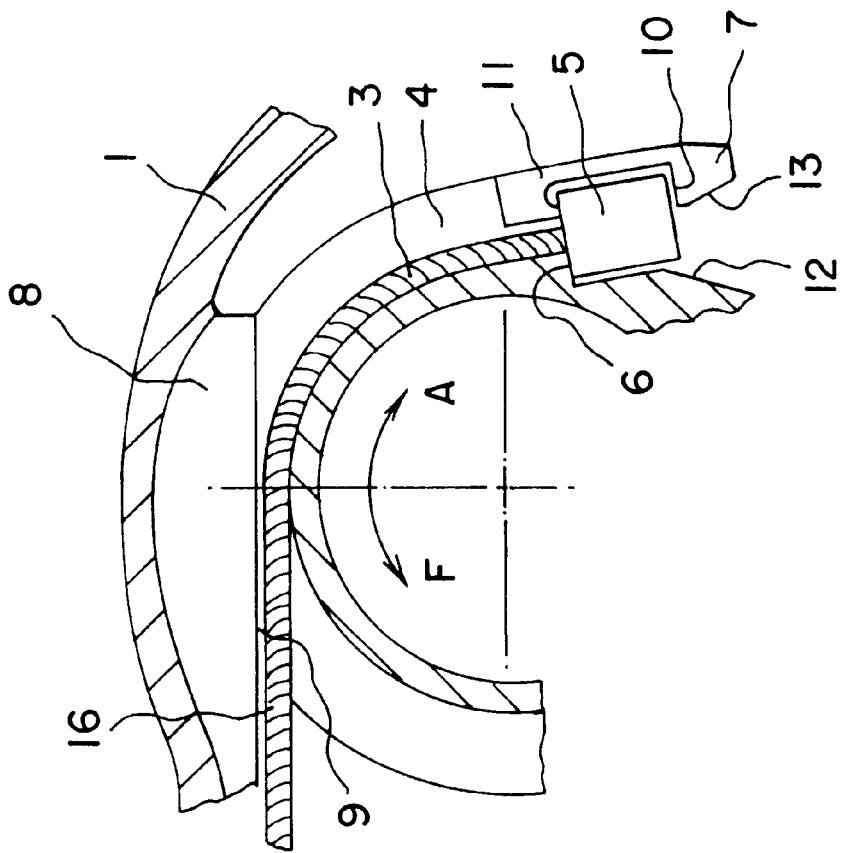
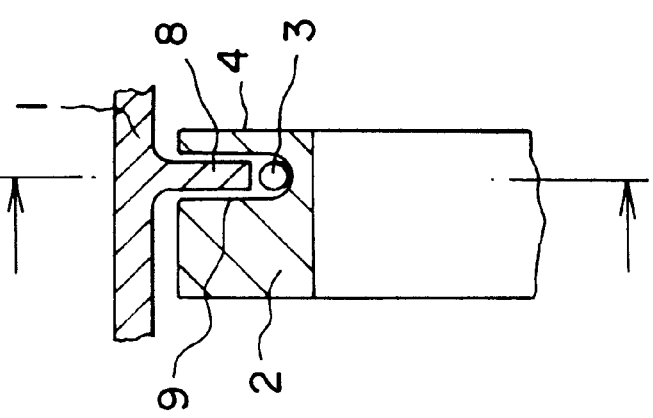

CABLE GUIDE IN A SHIFT LEVER FOR BICYCLE GEARS

BACKGROUND OF THE INVENTION

Field of the Invention

The invention relates to a shift mechanism for a set of bicycle gears in accordance with the precharacterizing clause of claim 1.

European Patent Application EP 0 676 325 A2 has disclosed a twist grip shift for a bicycle, by means of which bicycle gears can be shifted using a Bowden line. The cable of the Bowden line is pulled into the housing of the shift mechanism by means of a cable reel when the latter is twisted in a winding rotational direction, a tensile force acting on the cable in the set of gears having to be overcome. The tensile force keeps the cable tensioned in the shift mechanism and in the Bowden line, for which reason the cable also rests on the cable reel when the cable reel is twisted in a releasing rotational direction, thereby releasing the cable in the direction of the bicycle gears. FIGS. 3, 5 and 6 show, in particular, the path of the cable from its fastening on the cable reel to the point where it leaves the housing, where there is no significant guidance of the cable associated with the redirection of the cable. When the cable reel is twisted in the winding rotational direction, jamming can namely occur in the bicycle gears, as a result of which the cable temporarily loses tension and, in the shift mechanism in particular, can cause a build-up on the cable reel between the point where the cable emerges from the housing and its end, this build-up causing the cable to spread out in an arc in the housing and rise from its proper position on the cable reel.

For the abovementioned case, the present invention provides guidance for the cable between the cable reel and the exit from the housing, preventing the cable from moving away to any significant extent from its position in the tensioned state when it is relaxed through delays in gear changes in the set of gears. Since the cable is generally secured on the cable reel by means of a nipple, it can furthermore also happen that when the cable is relaxed under the abovementioned conditions the nipple rises from its anchorage in the cable reel when the cable reel is rotated in the releasing rotational direction and causes jamming in the shift mechanism.

SUMMARY OF THE INVENTION

The invention has thus set itself the object of guiding a Bowden cable, which can be subjected essentially only to tension, in such a way on its way between its fastening on a cable reel by means of a nipple and the point where it emerges from a housing part of the shift mechanism that, when the cable reel is operated in the releasing rotational direction, the cable does not move away from the position it occupies under tensile loading, especially when the nipple is firmly connected to the cable reel.

This object is achieved by the features in the characterizing part of claim 1. Refinements can be found in the subclaims. An exemplary embodiment of a cable guide in a shift mechanism for bicycle gears is explained with reference to two partial sections, in which:

BRIEF DESCRIPTION OF THE DRAWINGS

FIG. 1 shows a cable reel in a housing part with a cable and a bar on the housing part;

FIG. 2 shows the bar in the housing part with a guiding edge for guiding the cable, forming a cable channel in a cable guide of the cable reel;

FIG. 3 shows the cable channel shown in FIG. 1, formed by a hollow profile on the bar in conjunction with the cable guide on the cable reel in a detail representation.

DESCRIPTION OF THE PREFERRED EMBODIMENT

If 1 denotes a housing part of a shift mechanism for bicycle gears, the housing part 1 has arranged rotatably within it a cable reel 2, on which a cable 3 is guided in a cable guide or groove 4, the cable 3 ending in a nipple 5, which is secured on the cable reel 2. The cable reel 2 can be operated in a winding or pulling rotational direction A and a releasing rotational direction F, causing the shift elements in a set of bicycle gears to change gear. The cable 3 is generally preloaded by a spring in the set of gears in such a way that it always assumes a straight-line position in accordance with the cable tension where it is not guided by profiles or edges. However, since with some bicycle gears the spring acting on the cable 3 in the set of gears cannot pull said cable in, particularly when the bicycle is not moving, since clutches or gearwheels cannot engage in one another when the set of gears is not rotating, a pressure is produced when the cable 3 is operated in the releasing rotational direction F, this pressure being capable of lifting the cable 3 out of its predetermined position on the cable reel 2 at the unguided points, especially in the shift mechanism. When the cable reel 2 is operated in the winding rotational direction A, the nipple 5 is taken along by an abutment 6 and the cable 3 is tensioned. If, for the above reasons, the cable 3 cannot be taken up by the gears when the cable reel 2 is operated in the releasing rotational direction, the nipple 5 could rise from the abutment 6 in the cable reel 2, leave its predetermined place and cause jamming between the cable reel 2 and the housing part 1. To prevent this, a holding device has been provided to hold the nipple 5 in the place allocated to it both in the winding rotational direction A and in the releasing rotational direction F, even under unfavorable shifting conditions in the set of gears. For this reason, a catch 7 has been provided, this catch having a tooth 10 that comes to rest on the end face of the nipple 5 once the nipple 5 has struck the abutment 6. The nipple 5 is moved into this position during the fitting of the cable 3 simply by being pulled in between a bevel 12 on the cable reel 2 and a contour 13 on the catch 7, allowing a tooth 10 on the catch 7, which can bend resiliently about a bending cross section 11, to snap in behind the end face of the nipple 5.

The housing part 1 has a bar 8 with a guiding edge 9 that follows the path of the cable 3 at least in part and forms a cable channel 14 with the cable guide 4, preventing the cable 3 from assuring an uncontrolled position within the shift mechanism when the cable reel 2 is operated in the rotational direction F for cable release. Preferably, the cable channel 14 is formed at least at a critical point 16 of the cable path, namely where the cable 3 leaves the cable reel 2. On the contrary, the cable is pushed out of the housing part 1 and produces a pushing force in the set of gears in addition to the tensile force of the spring, assisting the gear change in the set of gears.

I claim:

1. A shift mechanism for remotely operating gear changes in a set of bicycle gears, the shift mechanism comprising:
    a housing part;
    a cable reel having a cable groove, the cable reel rotatable in a pulling rotational direction for pulling the cable and a releasing rotational direction for releasing the cable, one end of the cable entering into a driving connection with the cable reel, at least in one of the pulling and releasing rotational directions;

a bar extending from the housing part to substantially cover the cable groove and having a guiding edge, the bar and the cable groove forming a cable channel configured such that the cable does not deviate when the cable reel is operated in the releasing rotational direction if the other end of the cable is not tensioned or taken up by the set of gears.

2. The shift mechanism as claimed in claim 1, wherein the end of the cable has a nipple for establishing the driving connection between the cable and the cable reel in the tangential direction in both pulling and releasing rotational directions.

3. The shift mechanism as claimed in claim 2, wherein the nipple comes to rest against an abutment in the pulling rotational direction and against a tooth of a catch in the releasing rotational direction.

4. The shift mechanism as claimed in claim 3, wherein the catch has a contour that, together with a bevel on the cable reel, forms a funnel shape through which the nipple can be pulled into its fixed position on an abutment and behind the tooth of the catch when the cable is being fitted.

5. The shift mechanism as claimed in claim 3, wherein the catch has a reduced bending cross section to assist the snap-fitting movement.

6. The shift mechanism as claimed in claim 1, wherein the cable channel is formed at least at a critical point of the cable path, where the cable leaves the cable reel.

7. The shift mechanism as claimed in claim 1, wherein the guiding edge follows a curve determined by tests.

8. The shift mechanism as claimed in claim 1, wherein the guiding edge of the bar has a curved profile.

* * * * *